C. B. Carpenter,

Ornamental Chain,

Nº 28,735.   Patented June 19, 1860.

Witnesses
F. A. Barden
S. B. Cook

Inventor
Charles B. Carpenter

UNITED STATES PATENT OFFICE.

CHARLES B. CARPENTER, OF NORTH ATTLEBORO, MASSACHUSETTS, ASSIGNOR TO ALBERT C. TIFFT, OF SAME PLACE.

WATCH-CHAIN.

Specification of Letters Patent No. 28,735, dated June 19, 1860.

*To all whom it may concern:*

Be it known that I, CHARLES B. CARPENTER, of North Attleboro, in the county of Bristol, in the State of Massachusetts, have invented an Improved Chain for Watch-Guards or Various other Articles of Jewelry; and I do hereby declare the same to be fully described and represented in the following specification and the accompanying drawings, of which—

Figure 1:
Figure 2:
Figure 3:

Figure 1 is a side view and Fig. 2, a longitudinal section of it. Fig. 3 is a top view of one of its links in an unbent state.

Figure 4:
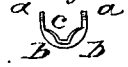

My said chain is what may be termed a "scale chain," as when made its surface has the appearance of being furnished with lapped scales. In constructing each link of such chain I at first form it from a flat piece of metal, as shown in Fig. 3, that is, with two dovetailed arms $a$, $a$, two scales $b$, $b$, and a shank connection or short bar $c$, arranged in a straight line with each other. Next the parts $b$, $c$, $b$, are curved into a concavo-convex shape, so as to bring the two parts $a$, $a$, into parallelism, as shown in Fig. 4.

In making the chain each link so constructed, except the first one, is to be laid crosswise in and over one another. The arms of the latter are next to be bent inward and down on and so as to clasp the part $c$, of the former, the head of each dovetailed arm being made to lie in the concave cup or bow of the scales of the lower link. On these arms the next or third link will rest, and when confined in place by the dovetailed arms of the second link will, with the scales, so close upon or cover the dovetailed arms of the first link as to prevent them from being easily disengaged from the scales.

Figs. 1 and 2 of the drawings exhibit the application of a series of links so as to form a chain as described, each link being laid crosswise on that directly under it and so as to rest on or over the arms that may be clasping the latter link.

I do not claim making a chain with links each of which is composed of three, four, or more radial arms projected from a common center, whereby when the chain is made it has a prismoidal form or presents a polygonal section, as my improved chain is circular or round in section, or has a form closely approximating to a cylinder and presents an appearance of being composed of overlying scales.

I claim—

An improved manufacture of jeweler's chain as constructed with each link having two arms $a$, $a$, two scales $b$, $b$, and a connection $c$, arranged and applied to a succeeding link as described.

CHARLES B. CARPENTER.

Witnesses:
S. B. COOK,
T. A. BARDEN.